United States Patent [19]

Small

[11] 3,757,248

[45] Sept. 4, 1973

[54] PULSED GAS LASER

[75] Inventor: James G. Small, Tacoma, Wash.

[73] Assignee: Massachusetts Institute of Technology, Cambridge, Mass.

[22] Filed: July 31, 1972

[21] Appl. No.: 276,433

[52] U.S. Cl. ................................ 331/94.5, 330/4.3
[51] Int. Cl. ............................................. H01s 3/09
[58] Field of Search ...................... 331/94.5; 330/4.3

[56] References Cited
UNITED STATES PATENTS 3,571,745   3/1971   Altman ............................. 331/94.5
3,553,603   1/1971   Leonard .............................. 331/94.5

OTHER PUBLICATIONS

Shipman, Jr., Traveling Wave Excitation of High Power Gas Lasers. Appl. Phys. Letters, Vol. 10, No. 1 (Jan. 1, 1967) pp. 3 and 4.

Leonard, Design and Use of an Ultraviolet Laser. Laser Focus (February 1967) pp. 26–32

Hodgson, Vacuum–Ultraviolet Laser Action Observed in the Lyman Bonds of Molecular Hydrogen. Phys. Rev. Letters., Vol. 25, No. 8 (Aug. 24, 1970) pp. 494–497

Primary Examiner—William L. Sikes
Attorney—Arthur A. Smith, Jr., John N. Williams et al.

[57] ABSTRACT

Pulsed gas laser construction with parallel electrodes disposed in free space with gas pressure bounding the arc along the elongated gap. A pulsed nitrogen laser employs a parallel plate transmission line with edges of its sheet-form conductors supported in free space of a vacuum chamber, with lasing arc established by Blumlein excitation techniques. A compact laser construction comprises a curved transmission line surrounding the elongated arc gap with interposed layers of insulation.

16 Claims, 9 Drawing Figures

PATENTED SEP 4 1973 3,757,248

PULSED GAS LASER

The invention herein described was made in the course of work performed for the Department of the Navy under Contract N00014–67–A–0204–0014.

This invention relates to pulsed operation gas lasers of the type known as transverse discharge lasers in which an exciting electric current flows across a gap transverse to the lasing path.

For a considerable period research efforts have sought a laser construction which combines high output per unit length with reliable operation and extended life. Those lasers now available which have satisfactory life are relatively costly to design and construct and are detrimentally limited in their performance with respect to power output per unit length.

Reference is made to U.S. Pat. No. 3,553,603 and the articles by Leonard, Laser Focus, February, 1967, pp. 26–32 and IEEE Journal of Qantum Electronics, March, 1967, pp. 133–135, for a laser of commercial form. For lasers of low repetition rate, experimental form, but relevant to the present invention, reference is also made to the articles by Shipman, IEEE Journal of Quantum Mechanics, August, 1966, p. 298 and Applied Physics Letters, Jan. 1, 1967, pp. 3–4 and by Hodgson, Physical Review Letters, Aug. 24, 1970, pp. 494–497.

An object of the present invention is to improve upon such lasers and to obtain a high-powered lasing action in a simple, reliable, and short configuration and one which is easily tailored to particular laser needs.

Other objects are to provide low cost lasers suitable for pumping dye lasers, for high speed photography, for radar applications, etc., and to provide in particular improved pulsed nitrogen lasers.

According to one aspect of the invention, a pulsed laser of the transverse discharge type is provided in which parallel electrodes are disposed in open space filled with lasable gas, with surrounding structure spaced apart from the electrodes to define a pressure-bounded arc region in which lasing occurs. Preferably, as for use in nitrogen lasers, the electrodes are spaced 1 to 4 cm apart to form the arc gap, surrounding structure is spaced from the electrodes a distance equal to at least a major fraction of the gap space, operating pressure is maintained between about 10 and 40 torr, and exciting voltage is between about 15,000 and 30,000 volts.

Preferably the electrode surface is continuous throughout its elongated extent and the circuit parameters define a pulse rise time less than the arc initiation time, i.e. less than 1 or a few nanoseconds.

According to another aspect of the invention, a gas laser comprises the combination of a parallel plate transmission line, preferably employing so-called Blumlein excitation, and a special electrode configuration in which electrodes forming part of the transmission line are disposed in free space filled with lasable gas, the surrounding structure being spaced from the electrodes to define a pressure-bounded arc region in which lasing occurs.

In preferred embodiments the electrodes comprise foils or plates of self-supporting material which extend in transverse cross-section as cantilevers in free space, terminating in elongated edges along the lasing path. Also preferably a pressure-resistant tubular structure of dielectric material is provided into which margins of sheet-form conductors extend, the structure defining a chamber connected with means to maintain pressure in the lasing range. Preferably a compact laser construction according to the invention employs a transmission line curved about the elongated arc gap.

According to another aspect of the invention, the point of switching of the parallel plate transmission line is spaced away from the gap and displaced from alignment with the center of the length of the gap, the expanding circular wave front of the voltage step from the switch propagating through the substance of the transmission line, causing the voltage step to progress along the length of the lasing path, to extend the duration of lasing and increase the peak output energy of the laser.

These and other objects and features will be understood from the following description of preferred embodiments taken in conjunction with the drawings wherein.

Figure 5:
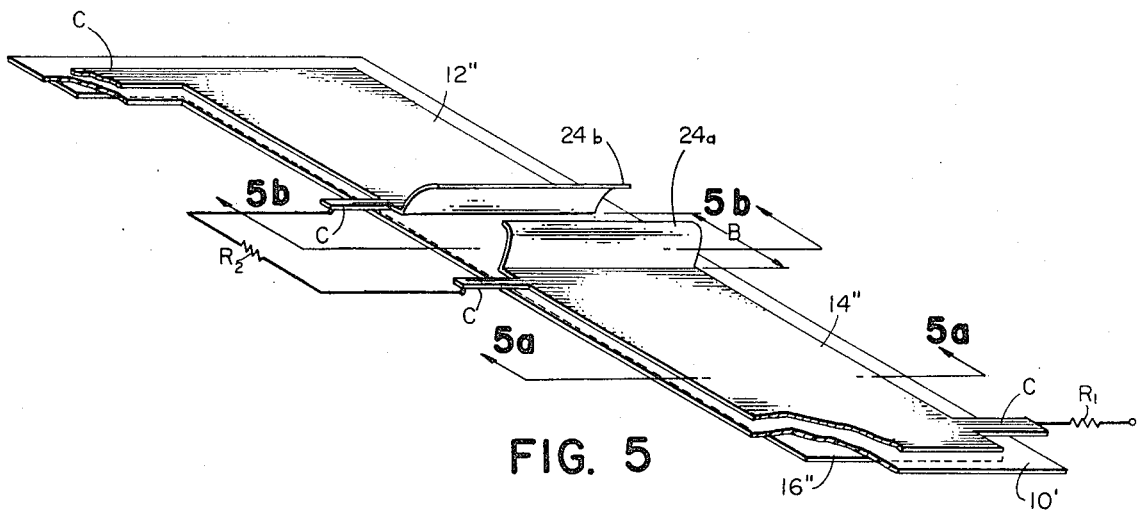
FIG. 5 is a perspective view of a flexible sheet-form arrangement of parallel plates for use in a Blumlein circuit.
Figure 5B:
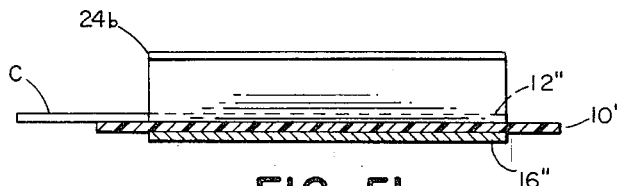
Figure 5A:
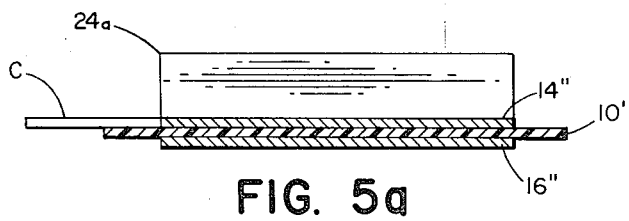
Figure 5C:
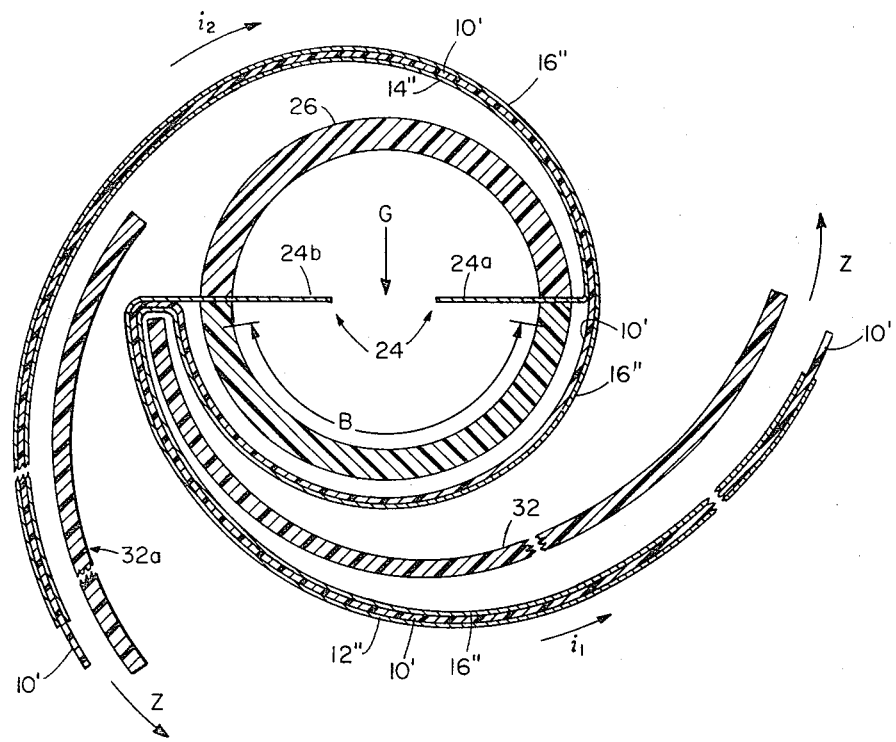
Figure 5D:
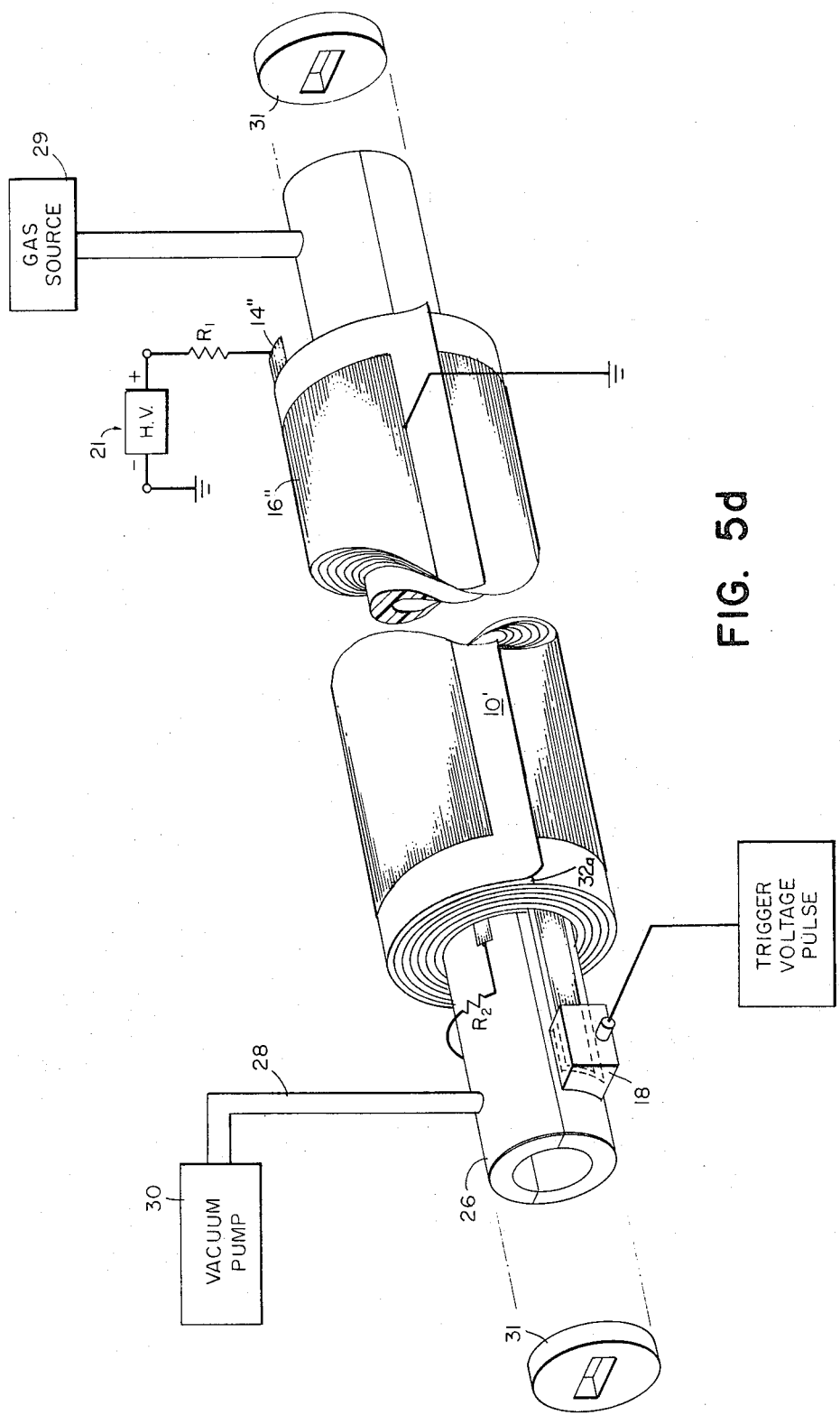

FIGS. 5a and 5b are cross-sections of FIGS. taken on lines 5a and 5b, respectively;

FIG. 5c is a diagrammatic cross section during assembly of the parallel plates and laser chamber; and FIG. 5d is a perspective view, partially diagrammatic, and exploded of the completed laser.

Figure 1:
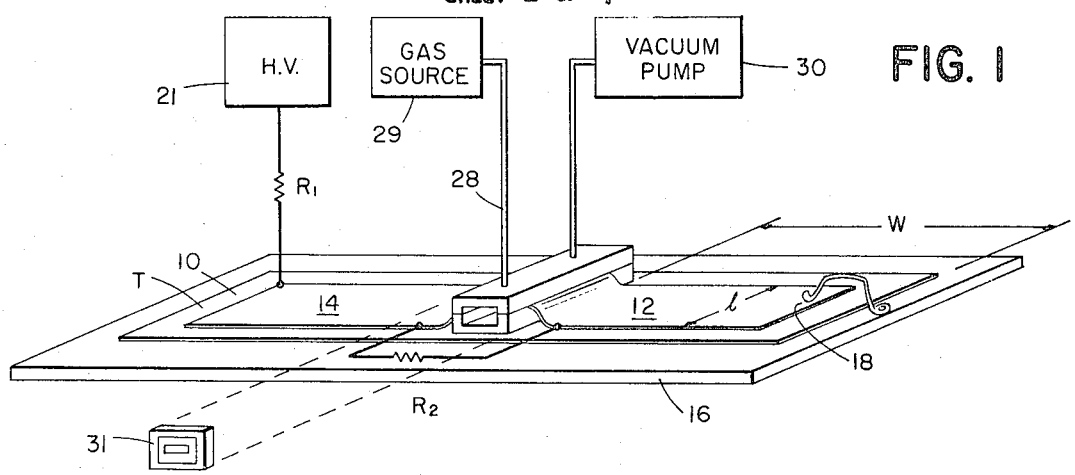
FIG. 1 is a diagrammatic perspective view of one preferred embodiment of the invention.

Referring to FIG. 1, a pulsed nitrogen laser is shown. Upon one side of dielectric sheet 10 are disposed first and second edge-to-edge conductive plates, 12 and 14 respectively. On the opposite side of the dielectric sheet 10 is a third conductive plate 16 which is parallel and coextensive with both plates 12 and 14. In this embodiment the dielectric sheet comprises acetate of 0.01 cm thickness. Plates 12 and 14 comprise copper foil of approximately 0.01 cm thickness and plate 16 is an aluminum plate of a thickness considerably greater than the copper foil. Plates 12 and 14 are of identical dimensions having dimension 1, along the length of the gap of 15 cm and width w of 45 cm. The conductive plate 16 is grounded and conductive plate 14 is connected to a high voltage source through resistance $R_1$ of 22 megohms which is of value to limit the charging current. Plates 14 and 12 are connected through charging resistance $R_2$ of 2 kilohms and plates 12 and 16 are selectively connected together through spark gap switch 18. Conductive plates 12, 14, and 16 all lie face to face against respective portions of the dielectric sheet with the exception of the arc gap region. The adjacent elongated continuous edges 20 of plates 12 and 14 forming the arc gap are spaced apart a distance $d$ on the order of 1.5 cm. In the region of this gap each plate 12, 14 extends away from the dielectric sheet 10 through bend 22, and turns back to a horizontal flange 24 terminating in the gap-defining edge 20. A hollow, tubular vacuum chamber 26 rests upon dielectric sheet 10 and flanges 24 are sealed to and extend through the walls and cantilever inwardly into the open space of the tube to form the gap. The edge 20 of each of the conductive members 12 and 14 is spaced a distance $d_1$ from each of the walls 26a and 26b that lie over and under the gap, distance $d_1$ begin greater than the half thickness $r$ of the characteristic ellipsoidal discharge arc A of the system, distance $d_1$ generally corresponding to a major fraction of the gap distance $d$ or greater, in this preferred embodiment $d_1$ being 1 cm. The edges 20 of the sheet-form conductors 12 and 14 are also spaced from the side walls 26c and 26d of the vacuum chamber a distance $e$ which is greater than the predetermined backward spread of the characteristic arc A. The vacuum chamber is formed of an insulating material, Lucite, (trademark for polymerized methyl methacrylate) and the distance along the dielectric inner wall of the chamber comprising the length $2e + d + 2d_1$, is characteristically more than twice the distance $d$ between the two electrode edges, effective to prevent formation of an arc discharge along the dielectric instead of through the arc gap. An end (or both ends if desired) of the vacuum chamber 26 is provided with a transparent end plate 31 for emission of light from the cavity. At one end of the vacuum chamber is gas line 28 connected to a source 29 of nitrogen through a suitable regulator, now shown, and to the opposite end is connected a vacuum pump 30 adapted to evacuate the chamber to a pressure on the order of 30 torr.

Figure 2:
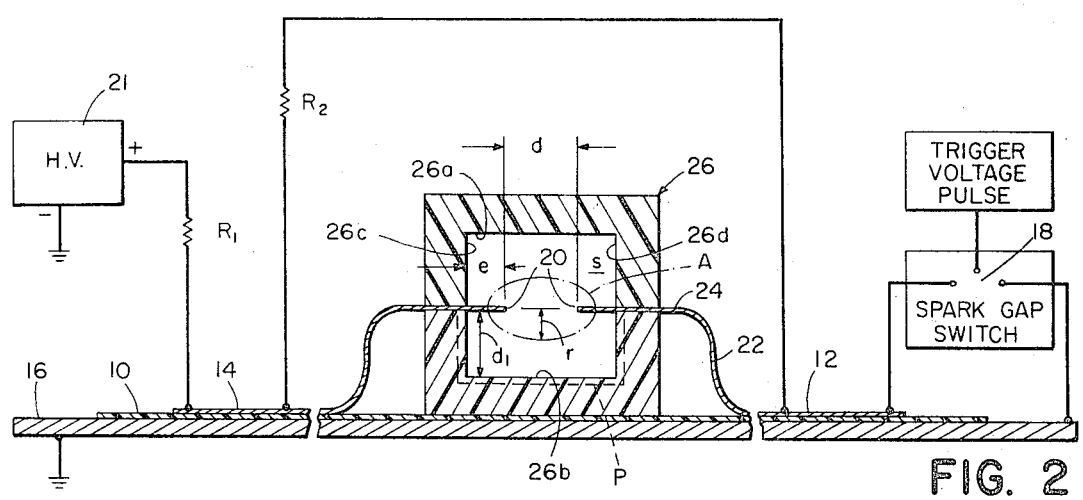
FIG. 2 is a cross-sectional view of the embodiment of FIG. 1 including a circuit diagram.

In operation, referring to FIG. 2, the plates 12, 14, and 16 may all be assumed initially to be at ground potential with plate 16 grounded and plate 14 connected through resistance $R_1$ to high voltage source 21. Quickly current flows through resistance $R_1$ charging plate 14 and from plate 14 through resistance $R_2$ charging plate 12. During this time, spark gap switch 18 is open. The tubular vacuum chamber 26 is evacuated to 30 torr and a flow of welding grade nitrogen is maintained from gas source 29 to the vacuum pump through the gap defined by the paralled opposed electrode edges 20 and through the space $s$ between the edges 20 and the surrounding tubular structure. When the plates are charged, the switch 18 is actuated and immediately a voltage step is generated at the switch. Traveling at nearly the speed of light, the voltage step in expanding circular waVe form propagates from the switch. With width $w$ of the conductive plate 12 being large, hence the wave front nearly straight when reaching the gap, a significant portion of the gap is subjected to the wave front voltage step at virtually the same instant. This voltage step creates momentarily a large voltage drop across the gap which under these conditions ionizes the nitrogen and a high current density arc is created. Due to the low inductance of the system (found not to be much affected by raising of the margins of plates 12 and 14 from the parallel assembly to form space $s$) the voltage rise is very rapid indeed and exceeds over a substantial length of the gap the speed at which the arc is initiated, i.e. less than 1 nanosecond. Thus the length of the gap arcs simultaneously. In transverse cross-section the size of arc is characteristic of the system, determined by the predetermined gas pressure of 30 torr, the spacing of the two electrode edges 20 and the nature of nitrogen.

It is realized according to the invention that the particular pressure of around 30 torr, which is the optimum for nitrogen lasing conditions, can so bound or confine the nitrogen arc that highly effective lasing conditions can be obtained with efficient laser output, enabling use of the simple structure just described. With walls spaced away this pressure-bounding of the arc region prevents arc effects from reaching the side walls of the vacuum chamber, avoiding deterioration of walls or disturbances to the laser output. Also, because the walls of the chamber do not interact with the arc or with light generated thereby, and because of the extremely fast rise time of the voltage, the current densities and laser output are substantially uniform and along the arc region. This leads to a generally uniform intensity light beam. Such lasting persists as the voltage step travels beyond the gap to the end T of the conductive plate 14 at which time the arc is extinguished and lasing stops, completing the cycle.

The action just described can be repeated rapidly, depending upon charging time of the system, and automatically if desired. In this embodiment the characteristics of the spark gap switch 18 are established relative to the characteristics of the time constant of the remainder of the circuit to define a relaxation oscillator which, in a repetitive manner, automatically fires the switch 18 when a substantially full charge is received by plates 12 and 14.

Among other virtues of the laser just described are that the accuracy of shaping and positioning of the electrode surfaces are found not to be critical. In fact, normal sheet metal cutting techniques for metal foil are adequate. Similarly, the purity of the gas is not critical. The parts are extremely simple and low cost, yet due to the gas pressure-confined nature of the high power arc, the dielectric parts have extremely long life despite long durations of use at high pulse repetition rate.

The lasing action is in accordance with known quantum mechanical principles. Suffice it to say that the sudden high voltage discharge (after an arc initiation process involving formation of electron streamers through the gap) produces a flow of highly energetic electrons across the gap, this being uniform along the length, with jitter less than one nanosecond due to the specified fast pulse rise time. The high energy electrons collide with electrons of the atoms of the gas and produce the inverted population of energetic atomic states known to be the basis for laser operation. The longer the length of the gap and the higher the current flow, the more the lasing power. The discharge occurs very fast, avoiding quantum mechanical relaxation processes in the atoms, which tends to fill up the lower states rapidly. In time, however, e.g. 10 nanoseconds, the relaxation processes cause loss of the inverted condition and termination of lasing. The embodiment just described produces a very fast rise time pulse which allows lasing, attributable to use of a very low inductance spark gap switch and a pulsing circuit (the transmission line) which allows the current to rise very rapidly. The embodiment just described employs the particular type of transmission line pulse forming network (e.g. as used in radar applications) known as the Blumlein circuit.

The phenomenon of pressure bounding of an arc per se is of course old, as it has been understood in plasma physics that collisions of atoms in the arc with gas molecules outside can establish an ellipsoidal arc of size varying with pressure. However, little in general from plasma physics applies to lasing technology, for instance most plasmas and arc sizes do not lase. The discovery here involved is that with establishment of lasing pressures and electrical conditions, as described above, gas pressure alone can confine the arc such that effective current densities, e.g. 1,000/amps per $cm^2$, can be obtained, and sufficiently long periods can occur between collisions of excited atoms to allow the needed quantum mechanical process to proceed, resulting in efficient lasing. In the case of nitrogen, with the electrodes disposed in free space per the embodiment of FIGS. 1 and 2, i.e. without intermediate side walls but rather with gas molecules bounding the effective arc region, the following results were obtained:

| | |
|---|---|
| nitrogen | 30 torr |
| electrode thickness | .1 cm |
| arc thickness | 1 cm |
| arc (gap) length | 15 cm |
| gap voltage | 20 kv |
| peak lasing power output | 20 kw |

This lasing action was sufficient to pump a Rhodamine 6G dye laser to superradiance.

The laser amplification of this 15 cm long embodiment is such that even without use of mirrors to reflect the light back and forth in the cavity, a super-radiant condition results, and it out-performs other lasers of similar length and type. By use of a plane mirror at one end the effective length is doubled. By use of other mirrors and common techniques an effective laser can be produced according to the invention as short as 1 cm in length. This may consist of the known system of a fully reflective mirror at one end and at the opposite end a restrictive aperture followed by a half reflective, half transmissive mirror, followed by a lens system to produce a beam of plane wave front which may them be amplified to high power by a laser according to the invention without mirrors.

Figure 3:
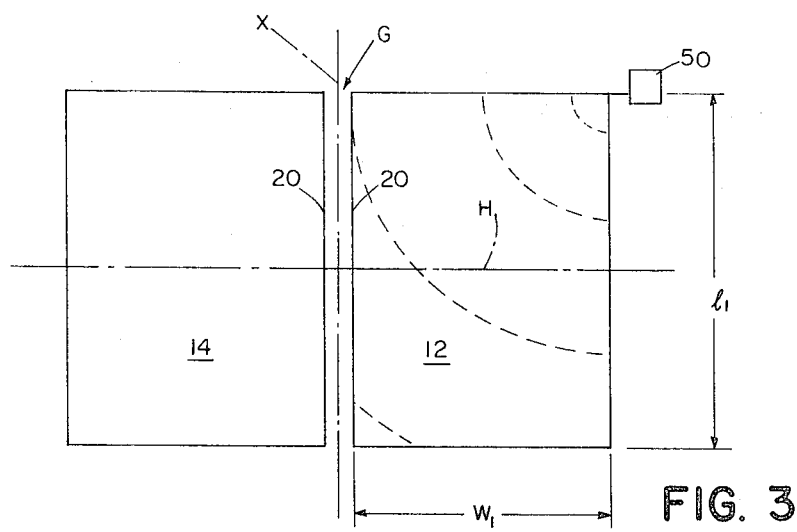
FIG. 3 is a top diagram plan view of another embodiment of the invention.

Referring to FIG. 3, a laser in accordance with the embodiment of FIG. 1 is shown with gap G having axis X defined by edges 20 of plates 12 and 14. The conductive plates 12 and 14 rest upon a sheet of dielectric material below which is a second conductive plate. In this embodiment a single spark gap switch 50 which initiates the voltage step is located at corner C on plate 12, spaced by width $w_1$ of the plate from the gap and spaced substantially from the line H representing the center line of the length of the gap. When the switch 50 is closed, grounding the charged plate 12, a voltage step is initiated which emanates in spherical wave form from the switch. The thickness of the plate 12 being negligible relative to the other dimensions this wave becomes a circular wave front of increasing radius, as suggested by the progression of expanding wave lines shown in the drawing. With the length $l_1$ of the laser on the order of a meter or more, the curvature of the wave front so delays the arrival of the voltage step to the most remote portion of the gap relative to the closer portions that, despite relaxation conditions stopping the lasing action in the closer regions, lasing action in the most remote regions continues for a significant time on the basis of light being received from the closer regions, and lasing is enhanced. The delaying action here described is similar to that taught by Shipman in his article entitled: "Traveling Wave Excitation of High Power Gas Lasers"—Applied Physics Letters, Jan. 1, 1967, but is achieved by a single switch and the propagation of a voltage step through the substance of a sheet conductor rather than by the use of multiple cables of graduated lengths, etc., and is therefore simpler.

Figure 4:
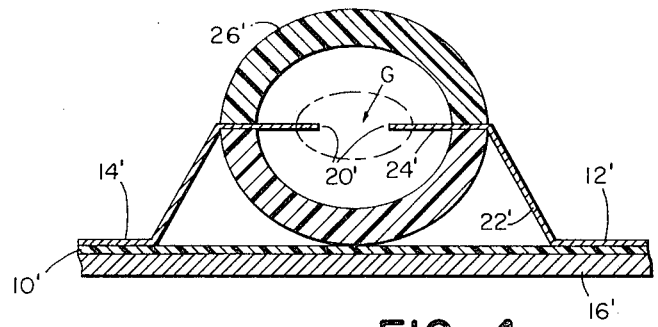
FIG. 4 is a perspective view of portions of another embodiment of the invention.

Referring to FIG. 4, an embodiment is shown suitable for long length lasers. The vacuum chamber 26' is formed of a pair of cylindrical sections through which flanges 24' of the plates 12' and 14' extend. The curved walls formed of a dielectric such as lucite readily withstand the vacuum of design pressure of 30 torr. A laser constructed according to FIG. 4 with operating parameters substantially the same as the embodiment of FIG. 1, but with arc length of 1 meter can lase with peak power in the range of 500 to 1,000 kilowatts.

Referring to FIGS. 5-5d, the embodiment is similar to FIG. 4 saving that the plates 12'', 14'', and 16'' comprise foils or conductive sheet-form deposits as by electroplating upon flexible dielectric sheet member 10'. These members, forming a parallel plate capacitor or transmission line, are retained in a curved position spaced by flexible, relatively thick insulator 32 and 32a forming a compact unit. More particularly a thin, e.g. 0.01 cm thick, dielectric sheet 10' carries laminated conductors '', 14'' and 16'', e.g. of copper. These have side tabs C as indicated for electrical connections as previously described to enable operation according to the Blumlein excitation techniques. The flanges 24 for instance may comprise separate members, e.g. of tungsten, electrically joined throughout their length to the respective plates 12'' and 14'', or as shown the conductors 12'' and 14'' may comprise copper foils laminated to the dielectric sheet 10', with the inner portions forming free flanges 24 unlaminated to the sheet 10' and cantilevering toward each other into the chamber 26 as shown. The flexible insulating separators 32, 32a are for example 10 to 20 times as thick as dielectric sheet 10', and are provided to prevent undesirable electrical interactions between the layers. The members are curved together, see 5c, to produce the finished, coiled assembly of FIG. 5d. Referring in particular to FIG. 5c the laser is constructed by inserting the flange 24a associated with plate 14'' into an axially elongated, radial slot in cylindrical chamber 26, and the remainder of the sheet-form assembly corresponding to plate 14'' is wrapped in counter-clockwise direction, passing over the top of the cylindrical chamber, thus plate 14'' extending counterclockwise from its electrode. The blank portion B of the assembly (comprising dielectric sheet 10' and plate 16'') which extends from the region of flange 24a (connected to plate 14'') to the region of flange 24b (connected to plate 12'') is wrapped in the clockwise direction, about the lower surface of the cylindrical chamber to the point where flange 24b is inserted into a diametrically opposite slot in the chamber. From this point the flexible assembly of dielectric sheet 10' and plates 12'' and 16'' is folded back upon itself about a free edge of insulator 32, and together they are wrapped in counter-clockwise fashion in the direction of the arrow z, insulator sheet 32 preventing contact between overlying portions of plate 16''. The flexible assembly of sheet 10' and plates 14'' and 16'' extends over the just mentioned folded portion and the insulator 32a is inserted to prevent contact of plate 14'' with plate 12'' at and beyond the fold. The insulators 32 and 32a extend from the fold region throughout the remaining length of the respective opposed conductors, the various layers being finally secured in the form shown in FIG. 5d. Afterward the electrical connections are made to the axially extending tabs as shown to complete the laser. During lasing the current as it passes successively through plate 12'', the gap G and plate 14'', travels first in one rotational direction $i_1$ and then in the opposite rotational direction $i_2$ (FIG. 5c). This assembly with sheet form conductors 12'' and -'' extending from the gap in the same rotational direction permits easy assembly without limitation on the size of the conductors 12" and 14", i.e. the distance from the gap to the outer edges of the conductors.

By virtue of curving the sheet form conductors of the pulsing circuit about the lasing gap, a self-shielding effect is obtained with respect to radio emissions from the gap. Furthermore, by curving the assembly so that the high voltage conductor is on the inside and the grounded conductor is on the outside, the surroundings are protected from the high voltage. In accordance with the last feature, with regard to the embodiment of FIGS. 5–5d, by making the non-folded end of the assembly appropriately longer than the folded end, the former having the high voltage conductor on the inside, wraps fully about the latter to form a protected package.

Numerous variations of the specific details will occur within the spirit and scope of the invention.

What is claimed is:

1. In a pulsed gas laser comprising the combination of a pair of substantially parallel metal electrodes having continuous electrode surfaces defining an elongated arc gap, a gas source for maintaining a lasable gas at lasable pressure in said gap, means cooperating with said electrodes to provide a circuit for applying a fast rise time lasable voltage pulse across said electrode along the length of the gap, and means providing a path to transmit light lengthwise from said path, the improvement wherein said electrodes are supported in open space, the gap between said electrodes and the space between each electrode and surrounding structure being open to said gas at lasable pressure to provide a pressure-bounded arc region over the effective length of said electrodes, the circuit parameters defining a voltage pulse rise time over a substantial length of said gap which is less than the arc initiation time for said gas.

2. The pulsed laser of claim 1 wherein said electrodes are spaced between 1 and 4 cm apart to form said gap, and each electrode is spaced a distance of at least a major fraction of said gap space from surrounding structure.

3. The pulsed laser of claim 1 wherein said electrodes comprise edges of sheet-form conductive members.

4. In a pulsed nitrogen laser comprising the combination of a pair of substantially parallel metal electrodes defining an elongated arc gap, a gas source for maintaining nitrogen at a lasable pressure between about 20 and 40 torr in said gap, means cooperating with said electrodes to provide a circuit for applying a fast rise time lasable voltage pulse across said electrode along the length of the gap, and means providing a path to transmit light lengthwise from said path, the improvement wherein said electrodes are supported in open space, the gap between said electrodes and the space between each electrode and surrounding structure being open to said gas at lasable pressure to provide a pressure-bounded arc region over the effective length of said electrodes, said electrodes being spaced between 1 and 4 cm apart to form said gap, and each electrode being spaced a distance of at least a major fraction of said gap space from surrounding structure.

5. In a pulsed gas laser comprising the combination of a pair of sheet-form conductive members each having an edge substantially parallel with, spaced from, and opposed to the respective edge of the other to define an elongated arc gap, means exposing said gap to lasable gas at lasable pressure, said sheet-form conductors forming effectively one capacitor plate and lying over and parallel with a third sheet-form conductor, separated therefrom by dielectric means to form a capacitor, a high voltage means adapted to charge said capacitor to bring said first and second conductors to an elevated voltage, switch means for rapidly shorting the capacitor, said switch means connected to the first and third of said sheet-form conductors and adapted to produce a fast-rising voltage step in said first conductor which travels to the gap, forms an arc thereacross and thence proceeds across second conductor while said arc supports lasing, and means providing a path to transmit light lengthwise from said gap, the improvement wherein said pair of edges of said sheet-form conductors are supported in open space, the space between each edge and surrounding structure being open to said gas to provide a pressure-bounded arc region.

6. The laser of claim 5 wherein said sheet-form conductors are comprised of solid conductive metal and said edges comprise continuous, elongated electrode surfaces, the circuit parameters providing a voltage rise time over a substantial length of said gap which is less than the arc initiation time for said gap.

7. The laser of claim 5 wherein said dielectric means includes a dielectric sheet, said third conductor lying along one face of said dielectric sheet and said first and second conductors lying along respective regions of the oppositelydirected face of said dielectric sheet, said opposed edges of said first and second sheet-form members being spaced substantially from said dielectric means including said sheet to provide an arc-bounding gas space therebetween whereby contact is prevented of the dielectric means by the arc generated at said gap during lasing.

8. The laser of claim 5 including a gas chamber comprising an elongated hollow tubular member, flanges of said first and second sheet-form conductive members extending as cantilevers into the gas volume of said tubular member, terminating at said edges.

9. The laser of claim 8 wherein the edges forming said arc gap are spaced apart between 1 and 4 cm, the wall of said tubular member overlying said gap being spaced from said edges a distance equal to at least a major fraction of said arc gap, said means to evacuate said chamber adapted to maintain a predetermined pressure in the range of about 10 to 40 torr therein and said high voltage source adapted to maintain a voltage of between about 15,000 and 30,000 volts across said capacitor.

10. The laser of claim 5 wherein said sheet-form conductive members are bent into relatively compact form.

11. The laser of claim 5 wherein said gap is about a meter or longer in length, and said switch means comprises a switch connected to said first conductive member at a point spaced from said gap and from the center line through the center of the length of said conductive member, said switch adapted to generate a voltage step wave of expanding circular form in the substance of said sheet-form member which progressively intercepts said gap, thereby to maintain lasing at remote regions of said gap despite quenching in the initial regions thereof.

12. In a pulsed gas laser comprising the combination of a pair of substantially parallel elongated electrodes forming an elongated laser gap, said electrodes being electrically connected along their respective lengths to respective first and second sheet-form conductors which extend in opposite directions away from the gap, said sheet-form conductors together forming in effect a capacitor plate with a gap, and a third sheet-form conductor insulated from and extending generally parallel to said capacitor plate forming a capacitor therewith, means to charge the resultant capacitor and means suddenly to discharge said capacitor in a manner providing a lasable arc-producing voltage transversely across said gap, the improvement wherein said capacitor-defining sheet-form conductors are bent about said gap with insulation disposed between overlapping portions of said conductors.

13. The laser of claim 12 wherein said first and second conductors are joined to different spaced apart regions of a face of a dielectric sheet, and a third sheet-form conductor is joined to the other face of said sheet, the resultant assembly being flexible and held in curved configuration about said gap, the dielectric sheet and said first and third conductor extending continuously in one rotational direction from the respective electrode, the dielectric sheet and third conductor extending therebeyond in the opposite rotational direction to the second electrode, said dielectric sheet and third conductor being folded in the region of said second electrode and extending therefrom with said second plate in said first rotational direction whereby each of said first and second conductors curves away from the respective electrode in the same rotational direction about said gap.

14. The laser of claim 13 including two flexible insulating sheets one extending from the point of fold, along the inner surface of the folded assembly, preventing electrical inter-action between overlapping regions of said third conductor and the other flexible insulating sheet extending from the point of fold along the outer surface of the folded assembly, preventing electrical inter-action between overlapping regions of said first and second conductors.

15. The laser of claim 12 wherein said gap is disposed in a tubular chamber and said conductors are secured about the exterior of said chamber.

16. In a pulsed gas laser comprising the combination of a pair of substantially parallel elongated electrodes forming an elongated laser gap, said electrodes being electrically connected along their respective lengths to respective first and second sheet-form conductors which extend in opposite directions away from the gap, said sheet-form conductors together forming in effect a capacitor plate with a gap, and a third sheet-form conductor insulated from and extending generally parallel to said capacitor plate forming a capacitor therewith, means to charge the resultant capacitor and means suddenly to discharge said capacitor in a manner providing a lasable arc-producing voltage transversely across said gap, the improvement wherein said first and second sheet form conductors are connected to a high voltage source, said third sheet form conductor is connected to the ground, and the respective portions of said first and third sheet form conductors are held in a bent configuration with the high voltage conductor lying on the inside and the grounded conductor lying on the outside of the bend, thereby isolating the respective portion of the high voltage pulse forming circuit from the surroundings.

* * * * *